(12) United States Patent
Maggenti

(10) Patent No.: US 6,295,284 B1
(45) Date of Patent: Sep. 25, 2001

(54) METHOD AND APPARATUS FOR PROVIDING FAIR ACCESS IN A GROUP COMMUNICATION SYSTEM

(75) Inventor: Mark Maggenti, San Diego, CA (US)

(73) Assignee: QualComm. Inc., San Diego, CA (US)

( * ) Notice: Subject to any disclaimer, the term of this patent is extended or adjusted under 35 U.S.C. 154(b) by 0 days.

(21) Appl. No.: 09/220,140

(22) Filed: Dec. 23, 1998

(51) Int. Cl.$^7$ ........................................... H04J 3/00
(52) U.S. Cl. .............................. 370/328; 370/444
(58) Field of Search .................. 370/328, 329, 370/341, 342, 441, 442, 335, 443, 444, 461, 462, 347, 411, 351, 352; 709/220, 234, 313, 105, 106; 710/120, 240; 340/825.51, 825.03, 825.01, 825.52; 375/130, 134, 135

(56) References Cited

U.S. PATENT DOCUMENTS

| 4,318,182 | * | 3/1982 | Bachman et al. | 364/200 |
| 4,451,881 | * | 5/1984 | Grice et al. | 364/200 |
| 5,095,529 | | 3/1992 | Comroe et al. | 455/16 |
| 5,369,781 | | 11/1994 | Comroe et al. | 455/15 |
| 5,387,905 | | 2/1995 | Grube et al. | 340/825.52 |

FOREIGN PATENT DOCUMENTS

| 0778680 | 6/1997 | (EP) . |
| 9417642 | 8/1994 | (WO) . |

* cited by examiner

*Primary Examiner*—Dang Ton
(74) *Attorney, Agent, or Firm*—Philip B. Wadsworth; Gregory D. Ogrod; Thomas M. Thibault

(57) ABSTRACT

A method and apparatus for providing fair access in a group communication system. Permission to transmit is based on a variable-level priority scheme. The variable priority level of each member in the system is based upon the number of event occurrences that have occurred in the past. In a first embodiment, the number of event occurrences is defined as the number of times that a member has been denied permission to transmit. The more denials that a member accumulates, the higher an corresponding priority level becomes. In a second embodiment, the priority level is based on the amount of time which has elapsed from when a net member was last granted the transmission privilege. The greater the time differential between when a member has last been granted the transmission privilege and a present access request, the greater the variable priority level becomes.

25 Claims, 5 Drawing Sheets

METHOD AND APPARATUS FOR PROVIDING FAIR ACCESS IN A GROUP COMMUNICATION SYSTEM

BACKGROUND OF THE INVENTION

I. Field of the Invention

The present invention relates generally to group communication systems and more particularly to a method and apparatus for providing fair access to a push-to-talk communication system for all members operating within the system.

II. Description of the Related Art

Point-to-multipoint communication systems have been used for many years to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a group or push-to-talk system. Such a system allows a group of individuals, each having a wireless communication device, to communicate with other members of the group. Typically, a group system relies on a single frequency, or dedicated channel, over which communications are received by the wireless communication devices. Only one member may transmit information to the other members at a time. However, all members can listen to the dedicated broadcast channel to receive communications from the single member who is transmitting. Members desiring to communicate with other members of the system typically send an access request by depressing a push-to-talk button on their respective communication devices which allows them sole access to the dedicated channel. Hence, these systems are known as push-to-talk communication systems.

Push-to-talk systems are typically used in outdoor settings where a group of people, or members, require communications with each other in a "point-to-multipoint" fashion. Examples of push-to-talk system uses include workgroup communications, security communications, construction site communication, and localized military communications. The group of people requiring communications with each other is commonly known as a "net," each member of the net sometimes referred to as a "net member."

In a typical push-to-talk system, a dedicated channel, sometimes referred to as a broadcast channel, is used to transmit communications from one member to multiple other members of the net simultaneously. The dedicated channel may comprise a single channel or frequency, or a group of individual channels managed by a controller to imitate the single channel. In either case, only one member may transmit voice and/or data communications to the other member users at any given time. If another member attempts to transmit voice and/or data over the broadcast channel while another member is transmitting, interference between the two competing communications will occur, resulting in non-intelligible voice and/or data being received by the other net members.

To prevent interference between members, many push-to-talk systems use an arbitration system to limit access to the broadcast channel to only one net member at any given time. Typically, the arbitration system is located at a central facility, base station, or other communication facility where communications between net members pass. The arbitration system typically comprises a digital computer which monitors transmissions from members for an access request signal. The access request signal is generated upon a net member depressing a push-to-talk button, located on the wireless communication device. The access signal is transmitted from the wireless communication device to the arbitration system prior to a net member commencing transmissions.

Generally, the arbitration system will allow a requesting member to transmit information over the broadcast channel if no other member is presently using the broadcast channel. If the broadcast channel is in use when a member requests access, the arbitration system may deny access to the requesting member. One problem with such an arbitration arrangement is that the probability of successfully acquiring the broadcast channel remains constant, no matter how many times a particular member has been denied. Thus, a member wishing to communicate important information to other members has no way of increasing his or her chances of obtaining access to the broadcast channel, despite repeated attempts to do so.

Another problem with present arbitration systems is that certain members may never get a chance to transmit on the broadcast channel if a large number of member users are constantly requesting access to the channel. In fact, as the number of members requesting access to the broadcast channel increases, the chances of any one net member being denied access increases proportionately.

Some arbitration systems have tried to overcome these problems by providing each member with a priority code. The priority code is generally preassigned to member users and remains unchanged. When a first member is transmitting over the broadcast channel and a second member having a higher priority code transmits an access request signal to the arbitration system, the arbitration system may discontinue the lower priority transmission of the first member and allow the higher priority transmission of the second member to take place. Such a priority scheme is problematic in that member users having high priority may dominate the communication system, preventing lower priority users access to the broadcast system.

What is needed is an arbitration system that will allow true fair access to a push-to-talk communication system without the problems inherent in present priority schemes.

SUMMARY OF THE INVENTION

The present invention is a method and apparatus for providing fair access in a group communication system. In accordance with the teachings of the present invention, permission to transmit, otherwise known as a transmission privilege, is based on a variable-level priority scheme. The variable priority level of each member in the system is based upon a number of event occurrences that have occurred in the past. In a first embodiment, an event occurrence is defined as a member being denied permission to transmit. Each time that a member is denied permission to transmit, the variable priority level associated with the member is increased relative to other members. Alternatively, each time that a member is denied transmission privileges, a variable priority code is altered to reflect the increased priority level of that member.

In a second embodiment, an event occurrence is defined as the passage of a predefined time period, typically one second, from the time that a net member was last granted the transmission privilege. The number of event occurrences, therefore, becomes the elapsed time from when a member was last granted the transmission privilege. This ensures that net members who have not been granted the transmission privilege for a significant time period have a better chance of obtaining the privilege on a subsequent request. The greater the time differential between when a member has last been granted the transmission privilege and a present access request, the greater the variable priority level becomes. Alternatively, a variable priority code is altered in accordance with the elapsed time from when a member was last granted the transmission privilege.

The above mentioned embodiments may be used separately or in combination with each other to provide an arbitration system tailored to the needs of the particular communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is an apparatus and method for providing fair access in a group communication system. Permission to transmit is based on a variable-level priority scheme. In one embodiment, the priority level of each member of the group communication system is varied in accordance with the number of times that a member has requested and been denied permission to transmit by an arbitration system. In a second embodiment, the priority level of members is varied in accordance with the elapsed time since a member was last given permission to transmit. The priority level of members is used to determine which member should be given permission to transmit (the transmission privilege) when two or more members request access substantially simultaneously, or alternatively, when a first member wishes to override a second member while the second member holds the transmission privilege.

Although the teachings of the present invention are described with respect to a wireless group or push-to-talk communication system, it should be understood that the present invention can be used with a wireline communication system, or a combination of a wireless and a wireline system, as well. In addition, the present invention can be used in a variety of non-telephonic applications, including Land Mobile Radio (LMR) systems, walkie-talkies, or a data communications network. Furthermore, it should be understood that the present invention is applicable to both voice and data applications.

Figure 1:
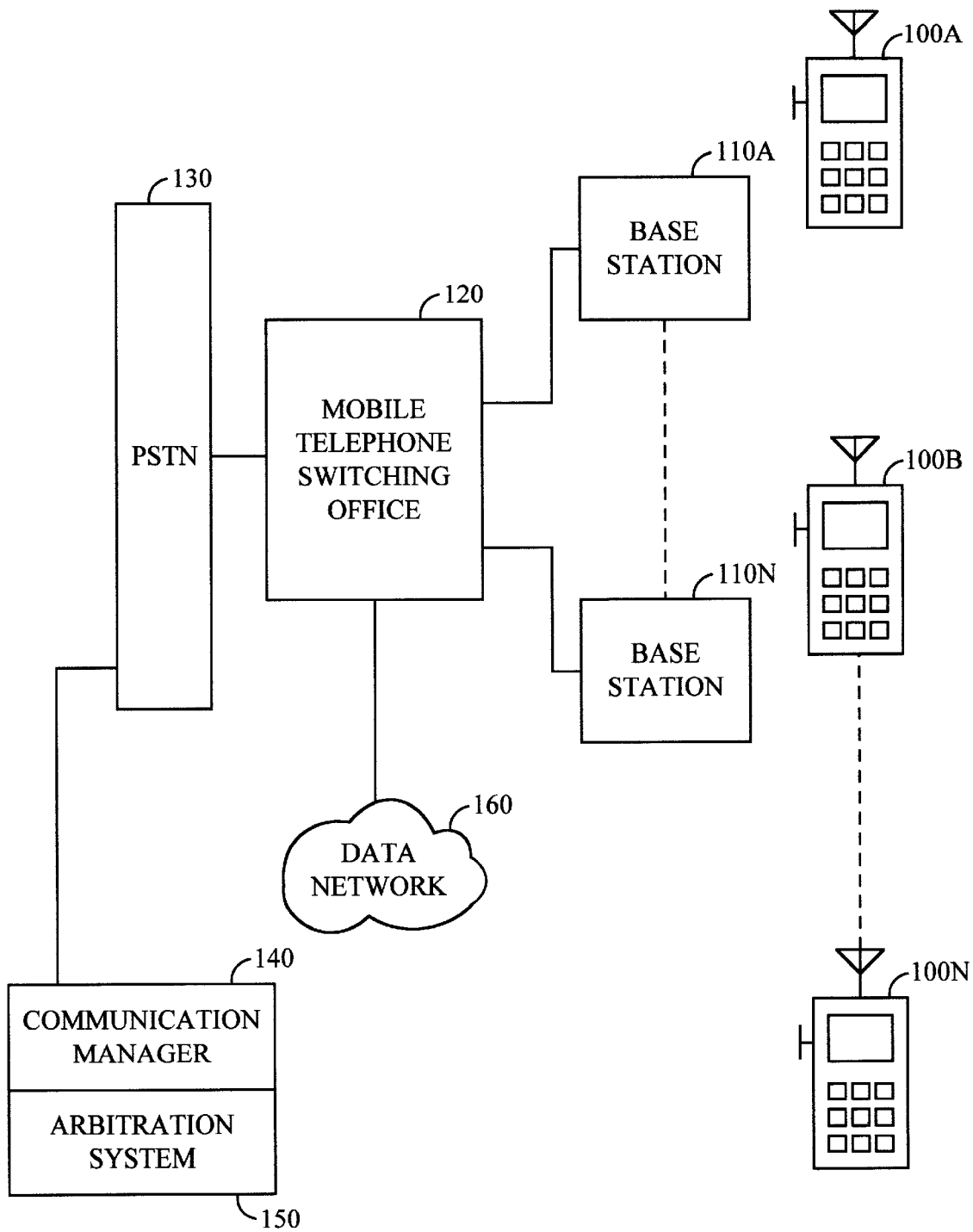
FIG. 1 is an illustration of a typical push-to-talk system in which the present invention is used.

FIG. 1 is an illustration of a typical wireless push-to-talk system, otherwise known as a net broadcast system, a dispatch system, or a point-to-multipoint communication system. It should be understood that the components shown in FIG. 1 are merely representative of one type of wireless communication system and that other communication systems may use different components in order to achieve similar results. The present invention, therefore, is not intended to be limited to the system shown in FIG. 1. In addition, the present invention is not intended to be limited to a wireless communication system. The principles described herein with respect to the invention apply equally to a wireline push-to-talk system, or a hybrid system comprising both wireline members and wireless members, as well.

In the broadcast system of FIG. 1, net members communicate with one another using a wireless communication device assigned to each member of the system. The term "net" denotes a group of member users, each authorized to communicate with each other within a communication system. Generally, a central database contains information identifying the members of the particular net. More than one net may operate in the same communication system. For instance, a first net may be defined having ten members and a second net may be defined, having 20 members. The ten members of the first net can communicate with each other, but generally not to members of the second net. In other situations, members of different nets are able to monitor communications between members of more than one net, but are only able to transmit information to members within their own net.

The wireless communication devices, or remote units, are shown in FIG. 1 as remote units 100a, 100b, and 100n, a single remote unit being assigned to each net member. The designations a, b, and n on the remote unit identifiers correspond respectively to a first net member, a second net member, and an nth net member, representing "n" number of members in the communication system. Although only three remote units are shown in FIG. 1, it should be understood that a push-to-talk system may have as few as two remote units or as many as one hundred remote units or more.

Referring again to FIG. 1, communications from remote units 100a through 100n are transmitted to and from base stations 110a through 110n, representing one through "n" base stations comprising the wireless communication system. Base stations are well known in the art for relaying wireless communication signals between remote units and between remote units and a central facility, such as mobile telephone switching office (MTSO) 120 and/or a Base Station Controller (BSC, not shown). Each base station 110 provides a coverage area ranging up to several miles in radius from the base station location. As remote units travel within the coverage area of each base station, communication signals to be transferred to and from the remote unit are routed generally through the particular base station to which the remote unit is most closely located.

A defining characteristic of traditional push-to-talk systems is that only one member may transmit information to other members at a time. This is due to the fact that a single frequency, or channel, is generally used by all remote units for transmissions and receptions. Consider, for example, a simple push-to-talk system using walkie-talkies. In such a system, the walkie-talkies communicate directly with each other without the need for a base station or other central communication manager. A dedicated channel is used for both transmissions and receptions, the transmissions and receptions occupying different time slots in the dedicated channel. If the dedicated channel is being used by a first user, any other user wishing to transmit must wait until the first user is finished transmitting. Otherwise, interference will result between the two users who are transmitting substantially simultaneously.

In a more sophisticated push-to-talk system, such as the one shown in FIG. 1, members communicate with each other via one or more base stations, rather than directly. An arbitration system is often used in these sophisticated systems to ensure that only one member is able to transmit to other members at any given time. The concept of a dedicated channel for transmission and reception may also be different in such a system. For example, the "broadcast channel" in such a system is simply the concept of allowing only a single member to communicate to other members, rather than a dedicated frequency over which to transmit.

For example, in an exemplary Code Division Multiple Access (CDMA) system, each member communicates with one or more base stations generally using a common frequency, each member using a unique modulation code to differentiate transmissions and reception from each other. Typically, each member establishes a forward link and a reverse link with one or more base stations, the former used to describe a channel from a base station to a remote unit, the latter used to describe a channel from a remote unit to a base station. When a member wishes to transmit a message to other members of the net, the message is sent over a reverse link, unique to the transmitting remote unit, to a base station. The message is then retransmitted to each of the other members over multiple forward links, one forward link for each member in the net, or alternatively, the message is transmitted over a single forward link which is monitored by all members. If two or more members try to transmit simultaneously to the other members, an arbitration system selects only one of the transmissions to be retransmitted to the other members.

Referring back to FIG. 1, MTSO 120 provides circuitry for routing communications between remote units operating in various base station coverage areas, as well as between remote stations and land-line telephone users through a Public Switch Telephone Network, shown in FIG. 1 as PSTN 130. MTSO 120 may, alternatively, or in addition to, be connected to computer network 160 to provide communications between remote units in the communication system and various known computing devices connected to computer network 160, such as personal computers, mainframe computers, digital cameras, email systems, remotely controlled devices, and so on.

MTSO 120 may comprise a switch, or Mobile Switching Center (MSC) as is known in the art, and a Base Station Controller (BSC) (both not shown). The MSC provides an interface to PSTN 130 while the BSC provides the necessary hardware and software for communications to take place between base stations. MTSO 120 typically provides other functions in the communication system as well, such as billing services and data services.

A communications manager 140 may be connected to PSTN 130, as shown in FIG. 1, or to data network 160 to provide push-to-talk communications in an existing point-to-point wireless communication system. Communications manager 140 provides a traffic controller (described later) which is used to enable one net member to simultaneously communicate with other net members when broadcast communications are desired. In addition, an arbitration system 150 may also reside at communications manager 140, which controls which member may hold the transmission privilege. An example of a communications manager operating in an existing wireless communication system is disclosed by U.S. patent application Ser. No. 08/595,566 entitled "Method and Apparatus for Providing a Private Communication System in a Public Switched Telephone Network," assigned to the assignee of the present invention and incorporated by reference herein.

Arbitration system 150 can be located at communications manager 140, or it can be located at MTSO 120, or at any one of base stations 110a through 110n. It may also be connected to a data network 160, for receiving communication signals in the form of data packets. An example of data network 160 is the Internet, in which data is exchanged between computers using predefined protocols, such as the well known TCP/IP protocol. Communications to and from remote units are converted into data packets suitable for transmission over data network 160. Members can connect a communication device, such as a telephone or a computer, to data network 160 and communicate with other members. The primary function of arbitration system 150 is to assign the transmission privilege to one member at a time.

Figure 2:
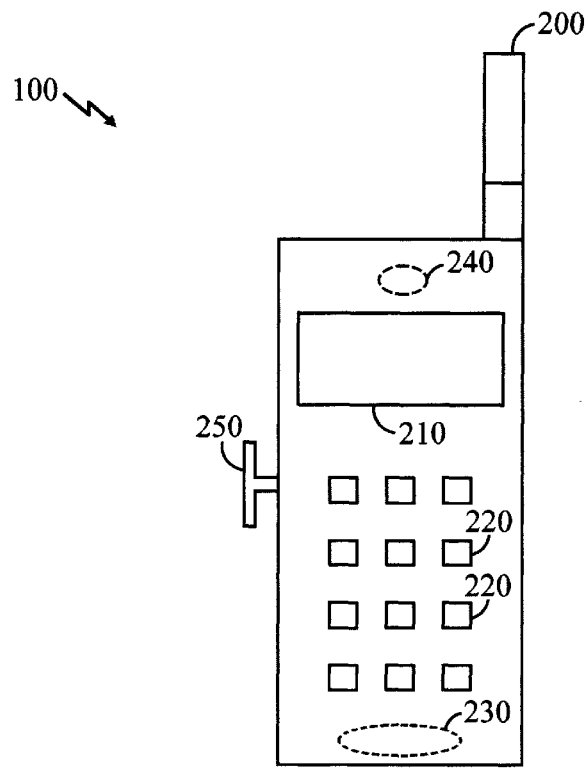
FIG. 2 illustrates a typical remote unit used in the push-to-talk system of FIG. 1.

FIG. 2 illustrates a typical remote unit 100, comprising an antenna 200, a display 210, keys 220, a speaker 230, an earpiece 240, and a push-to-talk switch 250. Remote unit 100 may be a wireless telephone employing one or more digital and/or analog technologies, a Land Mobile Radio (LMR), a walkie-talkie, a data computing device, or any device which allows wireless communications to take place. Typically, remote unit 100 is used to transmit and receive voice communications between net members. In addition, remote unit 100 may also have the ability to provide point-to-point communications to other wireless or wireline users of the communication system using either a wireless or a wireline communication device, or to a communication device not associated with the group of members operating in the particular net.

In addition to voice communications, remote unit 100 may also be equipped to transmit and receive data communications by integration with any data processing device such as a portable or fixed computer system, a position reporting system, or a meter reading system. Remote unit 100 may interface to such a data-generating device using an interface cable, having one end of the interface cable connected to the data processing device and the other end connected to a communication port (not shown) on remote unit 100. Alternatively, the necessary internal components of remote unit 100 may be integrated into the data processing device to form a single unit suitable for transmitting and receiving data and/or voice communications in an integrated package. In either case, remote unit 100 can be used to transmit data from the data-generating device to one or more net members, or to one or more non-net members.

When used as a voice communication device, a net member uses keys 220 to enter data into remote unit 100, the data typically comprising an identification number, such as a telephone number, of a second communication device belonging to a person whom the net member wishes to communicate. Keys 220 are also used in conjunction with display 210 to choose various communication options. For example, if a member wishes to communicate with all members of the net, keys 220 can be used to select such an option from a menu of options viewable from display 210. Keys 220 may also be used to select a sub-set of net members, instead of all net members, with whom the net member wishes to communicate. Other operational functions of remote unit 100 may be accessed by using keys 220 in conjunction with display 210, such as the volume at which earpiece 240 operates, the storage and retrieval of information, such as member names and associated telephone numbers, or various information regarding past communications placed or received by remote unit 100.

When a net member wishes to transmit voice or data to other net members, permission must first be sought by the member and granted by the arbitration system before transmissions are allowed to take place. The member generally requests permission to transmit, otherwise known as an access request, by depressing a push-to-talk (PTT) switch 250 located on remote unit 100. However, in other embodiments, the access request could be generated without the use of PTT 250, for example, by using verbal commands, a menu visible on display 210, or combinations of existing keys 220. Upon depressing PTT switch 250, remote unit 100 generates a talk request signal, which is transmitted ultimately to an arbitration system, discussed later herein. If no other net member holds the transmission privilege, permission to transmit is granted by the arbitration system, and the requesting net member is permitted to begin transmitting voice and/or data to other net members or non-net members, depending on who the transmitting net member has chosen to communicate with. If another net member is presently transmitting when the talk request signal is received by the arbitration system, or if a second access request signal is received by the arbitration system at the same time as the first access request is received, or under other situations, depending on the arbitration method, access to the broadcast channel is denied in the former case and a decision must be made by the arbitration system in the latter case as to which member will be permitted to transmit.

Figure 3:
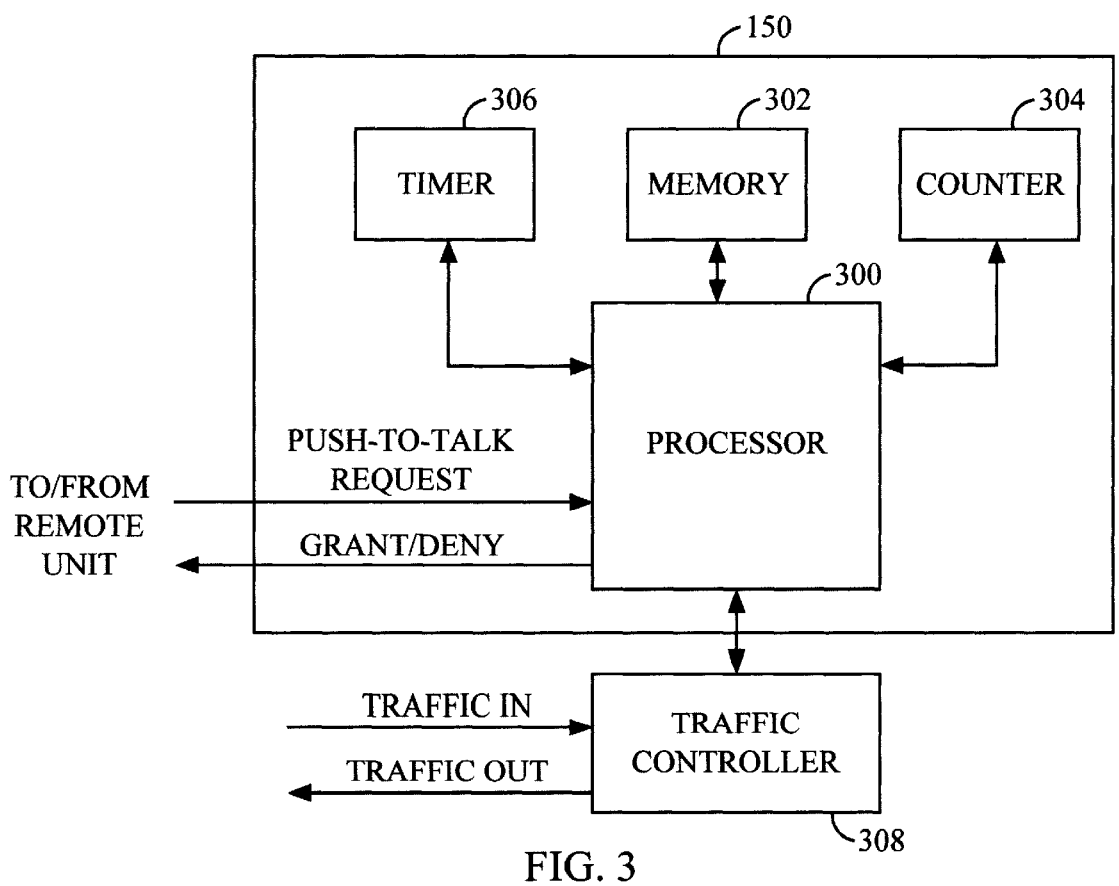
FIG. 3 illustrates the functional components of an arbitration system and a traffic controller.

FIG. 3 illustrates the functional components of arbitration system 150 and traffic controller 308. Processor 300 receives access request signals from remote units in the push-to-talk system. Processor 300 is generally a digital computational device, such as a personal computer, a mainframe computer, or simply a microprocessor, for example, any one of the 80×86 microprocessors from Intel Corporation of Santa Clara, Calif.

The access request signals contain at least information identifying the remote unit from which the request originated. Other information may be transmitted along with the access request as well, including the date and time the request was transmitted, the location of the remote unit when the request was made, to whom the present communication is directed to, or a present priority level assigned to the remote unit. Access request signals may be transmitted by remote units in the communication system using a control channel, a paging channel, a traffic channel, or by any means generally known in the art for transmitting messages. The present invention, therefore, is not limited by the method that access requests are delivered to processor 300.

Upon receipt of an access request signal, processor 300 determines whether or not to grant the transmission privilege to the requesting member. If no other member of the broadcast system is currently transmitting, processor 300 generally grants the transmission privilege to the requesting remote unit by sending a confirmation message to the remote unit, typically using the same form of communication that was used to receive the access request signal. At the remote unit, the confirmation message may take the form of an audible, visual, or tactile alert. In the case of data transmission, the confirmation message may simply trigger the start of data transmission, with or without the member user having to take any intervening action.

When the transmission privilege is granted to a member, in addition to a confirmation message, processor 300 sends one or more commands or control signals to traffic controller 308, directing it to route the requesting member's incoming transmissions to other members of the broadcast system. Traffic controller 308 has the capability to connect the transmission from any one member of the broadcast system to one or more other members of the broadcast system, depending on the commands or signals received from processor 300. Traffic controller 308 is well known in the art and can be a physical switch or a processor for providing packet data switching between members.

If a second member of the broadcast system is transmitting upon receipt of an access request message, or if two or more access request messages are received at substantially the same time by processor 300, the arbitration system must decide which requesting member to award the transmission privilege to. In either of the above cases, the priority level of each member is compared against each other to determine who should receive the transmission privilege. This may be achieved by assigning a variable priority code to each member of the push-to-talk communication system and comparing the codes between members, or it can be done directly by comparing one or more previous events, or event occurrences, which have been recorded for each member.

For example, in a first embodiment of the present invention, an event occurrence is defined as the number of times a member has requested and been denied the transmission privilege. This number can be compared against a competing member's denials, the member having the more denials having a higher priority level than the other member and being granted the transmission privilege. In a second embodiment, an event occurrence is defined as a time period which has elapsed since a corresponding member was last granted the transmission privilege, typically the time period being equal to one second. The number of event occurrences, or the elapsed time, is compared against the elapsed time of other members, the member having the longest elapsed time having the higher priority level and being granted the transmission privilege.

If a variable priority code is used to compare priority levels between members, the variable priority code may be based on one or more event occurrences, as described above, and/or determined in accordance with a fixed priority code which is pre-assigned to each member of a particular net, indicating the relative speaking priority of the members with respect to each other. For example, in a push-to-talk system designed for a military operation, a general might have a fixed priority code greater than a private, due to the perceived importance of communications emanating from a high ranking officer. The fixed/variable priority code of each member of the broadcast system is stored in memory 302, usually upon a remote unit first registering with the broadcast system, and can be represented in either integer or noninteger form. Memory 302 can be any device which is able to store and retrieve information, usually in the form of digital data. Various examples of memory 302 include a hard drive system, a Random Access Memory (RAM), and a tape drive system, as well as others.

The fixed and/or variable priority code(s) of each member are only two types of data which may be stored in memory 302 in association with each member of the broadcast system. Various other types of data may be stored along with the member variable priority code as well. Each type of data is stored in a field, and the combination of all fields associated with any one member is called a data record. Each record in memory 302 may comprise these other data types, including a variable priority code, a member name, a Mobile Identification Number (MIN), a status describing whether the member is currently registered with the broadcast system or not, the number of times that an access request was denied to the member by the arbitration system, the elapsed time between the last instance that the member was granted a transmission privilege and the present time, a time at which a transmission privilege was granted, and a time at which a transmission denial occurred. These data types are discussed in more detail below.

If the priority level associated with a first member requesting permission to transmit is lower than a priority level associated with a second member who is currently transmitting, as stored in memory 302, then permission to transmit is denied by processor 300 to the first member. In this case, it can be said that the second member currently holds a transmission privilege granted by the arbitration system and that the denial of transmission privileges can be called a transmission denial. In another embodiment, a transmission denial is given to a requesting member if the priority level associated with the requesting member is equal to or lower than the priority level associated with the member currently transmitting.

The transmission denial from processor 300 is communicated to the requesting member generally using the same communication protocol as was used by the member to transmit the access request to processor 300. The transmission denial may take the form of a denial message sent to the remote unit associated with the member requesting permission. In another embodiment, no denial message is sent; only permission to transmit is granted by the arbitration system. Upon receipt of the denial message, the remote unit may visually, audibly, or tactilely alert the member that his or her request has been denied.

If the priority level associated with a first member requesting permission to transmit is higher than a priority level associated with a second member who is currently transmitting, as stored in memory 302, then permission to transmit is given to the first member by processor 300 and withdrawn from the second member. In another embodiment, permission to transmit is granted to a requesting member if the priority level associated with the requesting member is equal to or higher than the priority level associated with the member currently transmitting.

Upon the requesting member being granted permission to transmit, processor 300 withdraws permission from the second member by sending a withdrawal message to that member, using the protocol discussed above. The withdrawal message may visually, audibly, or tactilely alert the member that transmitting privileges are soon to be withdrawn. After receiving the withdrawal message, the remote unit may be allowed to continue transmitting for a predetermined time period, typically on the order of a few seconds. In an alternative embodiment, once a remote unit receives the withdrawal message, transmission privileges are immediately halted.

After transmission privileges have been withdrawn from the second remote unit, or simultaneously thereto, processor 300 alerts the requesting member that it has been granted permission to transmit by sending a confirmation message to the remote unit, as described above.

Each time a member is denied transmission privileges by processor 300, a variable in memory 302 associated with the member who was denied the privilege is incremented. The variable is called the denial count. The time at which the transmission denial occurs may also be recorded. The denial count is used to determine how many times a particular member has requested and been denied permission to transmit. If variable priority codes are being used to compare priority levels, the variable priority code associated with the member is also adjusted in accordance with a predefined scheme at this time. For example, each time a member is denied permission to transmit, the denial count associated with the member is incremented by a predetermined amount, generally by one. In a system which uses variable priority codes, the variable priority code associated with the member who has been denied access is increased.

Counter 304 may be implemented in any number of ways as is well known in the art, including discrete digital components, or in software. Alternatively, processor 300 can increment the denial count by a predetermined value each time that a transmission denial has occurred without the need for counter 304. In systems which use variable priority codes, the variable priority code for a member is generally adjusted higher in response to each transmission denial to that member, so that the member will be more likely to obtain permission to transmit the next time permission is sought.

In another embodiment of the present invention, each time a member is granted permission to transmit, that event is also stored in a record associated with the member. In this case, the denial count may be decreased by a predetermined amount in response to the transmission grant in an amount generally equal to the predetermined amount when a transmission denial has occurred. If variable priority codes are used, the variable priority code associated with the member may then be decreased by a predetermined amount in proportion to the number of times the member has been granted permission to transmit. Alternatively, each time a member is granted permission to transmit, the denial count or the variable priority code of that member is reset to a predetermined amount, representing a default or normal priority level which most or all members of the broadcast system are initially assigned. The time at which permission to transmit is granted may also be recorded in the record corresponding to the member who has been granted the transmission privilege.

Timer 306 may be used in conjunction with the above method to limit the number of transmission denials or grants stored in memory 302 to a predetermined time period. For example, if a first member requests and is denied permission to transmit, the time of the transmission denial may be stored in the record associated with the first member in memory 302. Processor 300 may then periodically reduce the number of transmission denials stored in memory 302 if a predetermined time period has elapsed from the time that a denial was recorded. Take, for example, a first push-to-talk member, having been denied permission to transmit three times, the first transmission denial occurring at 10:05 A.M., the second occurring at 11:35 A.M., and the third occurring at 1:24 P.M. on a given day. If the predetermined time period is 120 minutes, and processor 300 checks memory 302 at 1:30 P.M., then any denials recorded prior to 11:30 A.M. will be eliminated from memory 302. In the example given, the transmission denial at 10:05 will be removed from the record of the particular member in memory 302. In an alternative embodiment, the transmission denial will not be removed from memory 302, but will instead be identified as an "old" denial. This embodiment has the advantage of knowing how many total denials any member of the broadcast system has obtained over the lifetime of that member. In addition, if the predetermined time period is increased at a later time for some reason, slightly old denials may then be included for purposes of calculating the variable priority code. In the example above, if the predetermined time period is increased from 120 minutes to 210 minutes, the transmission denial recorded at 10:05 would no longer be "old," and the total number of denials during the predetermined period would increase from 2 to 3.

In a second embodiment of the present invention, timer 306 could alone be used to calculate the priority levels of members in the broadcast system. In this embodiment, when a member requests and is granted permission to transmit, the time at which permission was granted is stored in a record corresponding to the member who received permission. The priority level of each member would then vary in accordance with the elapsed time since the last time a member was given permission to transmit. For example, if processor 300 receives three simultaneous transmission requests, one from a first member, one from a second member, and one from a third member, processor 300 computes a time difference between the time that the access requests were received and when each of the requesting members was last granted permission to transmit. The greater the time difference, the greater the priority level becomes. For example, in a system which uses variable priority codes, for each minute that has elapsed since the last time a member was granted permission to transmit, the variable priority code for that member might be increased by a predetermined amount by processor 300. Then the variable priority codes of the requesting members are compared, the member having the highest variable priority code receiving permission to transmit. Or, in the above example, processor 300 might simply compare the three elapsed times and choose the member who has not held the broadcast channel for the greatest amount of time. These examples are not intended to limit the number of different ways processor 300 can adjust priorities based on elapsed time. Other methods are envisioned, including adjusting the priorities of requesting members using a combination of the elapsed time and the number of transmission denials or grants that a given member has acquired.

Figure 4:
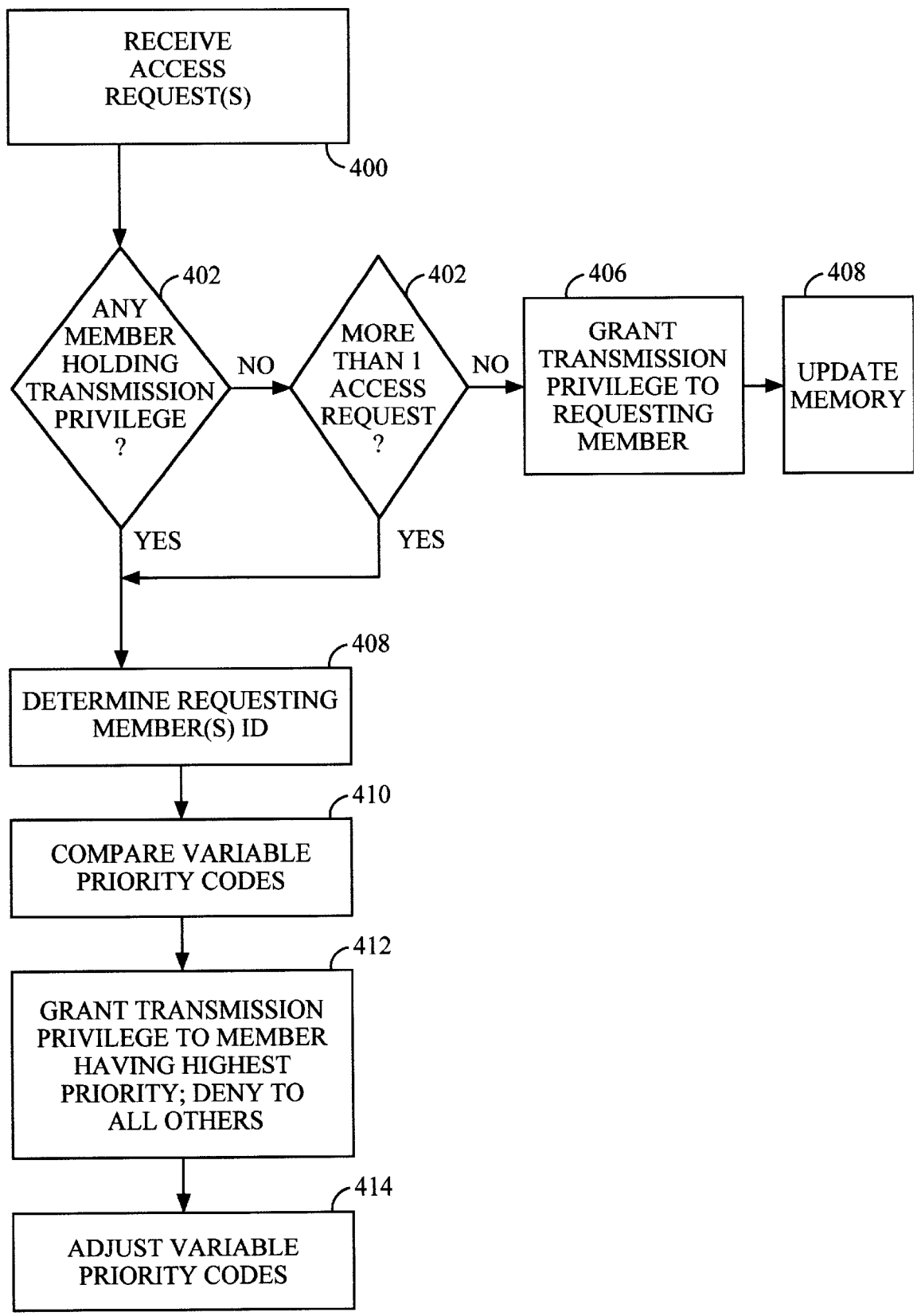
FIG. 4 is a flowchart detailing a method of the present invention.

FIG. 4 is a flowchart which details the method of the present invention. The method begins with step 400, in which processor 300 receives a single access request message or multiple simultaneous access request messages from one or more members of the push-to-talk system. In step 402, processor 300 determines whether or not any member is currently holding the transmission privilege. If no other net member in the broadcast system is currently holding the transmission privilege, processor 300 next determines whether more than one access request message was received in step 404. If only a single access request message was received, processor 300 grants permission to transmit to the requesting member, shown as step 406. In addition, processor 300 may send a confirmation message to the remote unit who has been granted permission, informing the requesting member that permission to transmit has been granted, and that voice or data may be transmitted to other members of the push-to-talk system. The confirmation message is generally transmitted to the remote unit using the same type of signaling method used to communicate the access request message to processor 300, although other methods may be used as an alternative. At the remote unit, the confirmation request may take the form of an audible, visual, or tactile alert. In the case of data transmission, the confirmation message may simply trigger the start of data transmission, with or without the member user having to take any intervening action.

In addition to the actions taken by processor 300 described above in step 406, processor 300 sends one or more control signals to traffic controller 308 to allow transmissions from the member who has been awarded the transmission privilege to be routed to other members of the net.

Upon granting permission to the requesting member in step 406, processor 300 updates a record associated with the requesting member in memory 302 with pertinent information regarding the grant, shown as step 408. Such information may include the time that the transmission privilege was given or an adjustment of the granted member's variable priority code, if variable priority codes are used to measure priority levels in the system.

If processor 300 determines that the broadcast channel is in use by another member in step 402, or that more than one access request message had been received in step 404, step 408 is next performed by processor 300 in which a member identification code is determined from each access request message received, and from the member currently holding the transmission privilege, if that is the case. As stated previously, each access request message that is transmitted by a remote unit contains at least identification information, generally in the form of an identification code, which uniquely identifies members within the broadcast system. The identification information may be transmitted using any one of a number of techniques which are well known in the art for transmitting data. For example, in a Code Division Multiple Access (CDMA) communication system based on Telecommunication Industry Standard (TIA) IS-95A, the access request message, including the identification information, may be sent in the form of one or more "frames," of data, generally transmitted on a signaling channel or a traffic channel. The identification information may be in the form of a numeric or an alpha-numeric sequence.

Once processor 300 has identified each of the identification codes from the requesting members and, if appropriate, the current member holding the transmission privilege, the current priority levels corresponding to the identification codes can be retrieved in memory 302, if priority codes are used in the system. In step 410, processor 300 compares the priority levels of the requesting members to each other and to the priority level corresponding to the current member holding the transmission privilege, if that is the case. In a system employing variable priority codes, the priority codes of the requesting members are simply compared with each other to determine the member having the highest priority level. Otherwise, the relative priority levels can be determined by comparing the number of times each member has requested and been denied transmission privileges, by comparing the elapsed time from when a member was last granted the transmission privilege, or a combination of the two.

In step 412, processor 300 grants permission to transmit to the member having the highest priority level. A denial message is transmitted by processor 300 to the remaining requesting members. If the broadcast channel is being withdrawn from a member currently holding the transmission privilege, a withdrawal message is transmitted from processor 300, alerting the member to the imminent loss of broadcasting privileges. Processor 300 also sends one or more control signals to traffic controller 308 to allow transmissions from the member who has received the transmission privilege to be routed to other members of the net.

Figure 5:
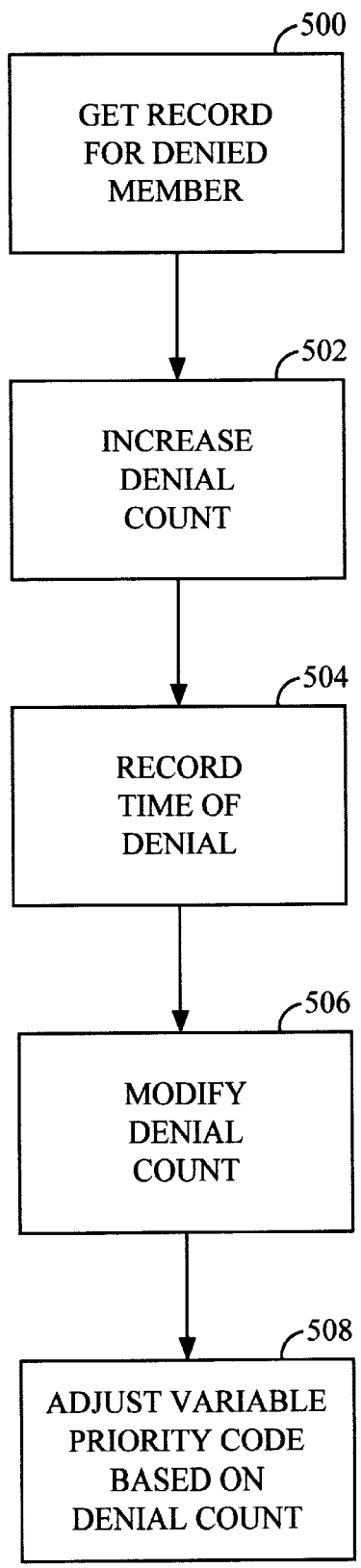
FIG. 5 is a flowchart detailing the steps used to determine a variable priority code in accordance with a first embodiment of the present invention.
Figure 6:
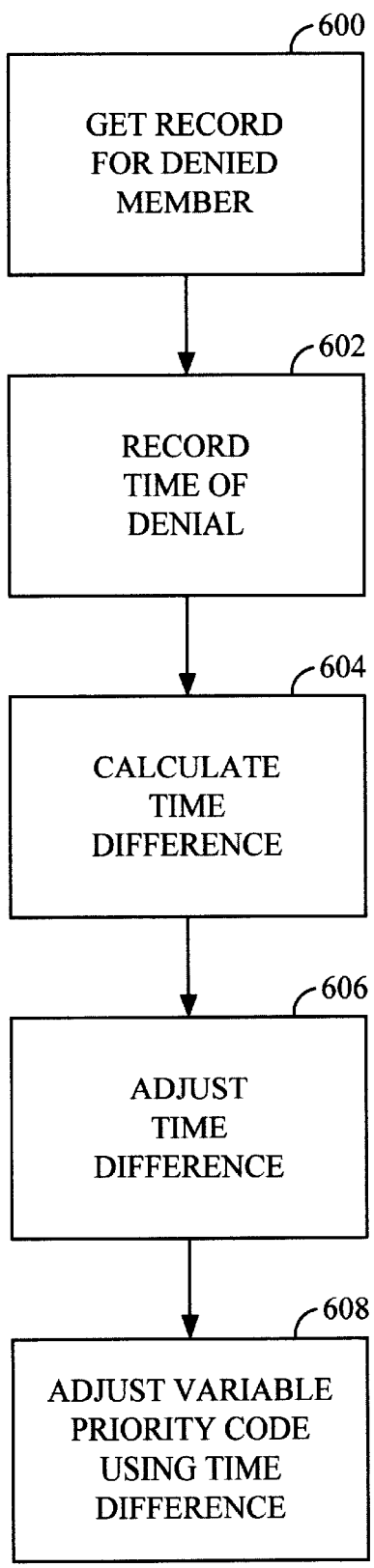
FIG. 6 is a flowchart detailing the steps used to determine the variable priority code in accordance with a second embodiment of the present invention.

In step 414, processor 300 adjusts the priority levels of the members associated with the foregoing steps. The details of step 414 are shown in FIGS. 5 and 6, described in more detail below. It should be understood that the adjustment to the priority levels may be accomplished prior to processor 300 comparing priority levels as well.

FIG. 5 is a flowchart detailing the steps for altering the priority level in accordance with a first embodiment of the present invention. In step 500, processor 300 retrieves a record from memory 302 corresponding to a member who has been denied permission to transmit. In step 502, processor 300 modifies the record to include the present transmission denial by incrementing a denial count. The increment can be either linear, exponential, or in any predetermined manner. In an alternative embodiment, a grant count is incremented if a member is granted permission to transmit.

In step 504, processor 300 records the time at which the transmission denial (or grant, in the alternative embodiment) was generated. In step 506, processor 300 optionally adjusts the denial (grant) count in accordance with one or more preselected parameters, criteria, or factors, a preferred one being a predetermined time period. Other examples include modifications based on the location of a member in the broadcast system when a transmission denial (grant) is given or the time at which a denial (grant) was given. In a time-based modification, denials (grants) given by processor 300 which have occurred more than a predetermined amount of time after they have been recorded in memory 302 are removed from the denial count. For example, if the predetermined time period is 90 minutes, any denials (grants) which have been recorded more than 90 minutes prior to the present denial are removed from the denial count denial (grant) count.

After the denial (grant) count has been modified in step 506, the variable priority code associated with the present member is determined in step 508, if variable priority codes are used in the system. Otherwise, no further action is taken, the member's priority level being based directly on the denial (grant) count. The variable priority code is generally increased (decreased) for each transmission denial (grant) in accordance with a predetermined format. In one embodiment, the variable priority code is simply equal to the denial count. As a member is denied permission to transmit, the associated denial count and, correspondingly, the variable priority code, increases by one. In another embodiment, the variable priority code is the difference between the denial count and the grant count.

In another embodiment, the variable priority code and denial count are two different variables, the variable priority code being generated based upon the denial count. For example, the variable priority code could increase by a factor of one for a first transmission denial, a factor of 2 for a second denial, and so forth. Or, the variable priority code could be derived from the present variable priority code, the denial count, and a fixed priority code pre-assigned to each member. Take, for example, a priority scheme in which each member of the broadcast system is assigned an initial variable priority code of 0 and most of the members are assigned a fixed priority code of 1. However, some members in this example may be considered more important than other members and, thus, the system would want to allow these members more frequent transmission privileges. For these members, the fixed priority code could be greater than the other priority codes assigned to less important members, for example 1.5. In this system, for every transmission denial, the variable priority code of a member could increase by the value of the fixed priority code. For example, in a military application, a high-ranking official such as a general could have a fixed priority code of 1.5, whereas a private could have a fixed priority code of 1. For every denial of transmission privileges registered by the general, his variable priority code could increase by 1.5 contrasted with an increase of only 1.0 for the private. In this type of system, the general's variable priority code and, hence, his chances of receiving permission to transmit, would increase more quickly than the private's. Of course, many other variations to adjust the variable priority based on the fixed priority code, the current variable priority code, and the number of denials are possible.

FIG. 6 is a flowchart detailing the steps for determining the variable priority code in accordance with a second embodiment of the present invention. In this embodiment, the priority level of each member is adjusted in accordance with the elapsed time since a member has last been granted permission to transmit. In such a system, members who request permission to transmit infrequently will obtain a higher priority over those members who request permission more often.

In step 600, processor 300 retrieves a data record from memory 302 corresponding to a member who has been denied transmission privileges, which includes an indication of when the last time the member was granted permission to transmit, known as the grant time. The grant time for each member may then be compared directly to other member's grant time to determine who has a higher priority level. A member having an earlier grant time will have a greater priority level than a member who has been granted transmission privileges at a later time. In another embodiment, processor 300 calculates a time difference between the current time of denial and the last time that permission to transmit was granted in step 602. If no previous transmission privilege grant time has been recorded in the data record, the time difference may be set to a predetermined value, such as 10 minutes, representing an average time between when members are given permission to transmit. The predetermined value may be a fixed or variable. In the case of a variable value, processor 300 may optionally calculate an average time that all members have been able to successfully receive transmission privileges, the calculation being performed at predetermined intervals. Alternatively, any other predetermined method may be used to determine the predetermined value.

The time difference as calculated in step 602 is stored as part of the record retrieved in step 600. In step 604, the time difference may be modified by processor 300, if desired. For example, the time difference may be increased or decreased depending on a member's fixed, or present, priority level. The time difference may be increased for a member having a higher priority level while the time difference may be decreased for a member having a lower priority level. Modifications may be based on other preselected parameters, factors, or criteria, such as location of the requesting member or the number of times permission to transmit has been denied.

In step 606, if variable priority codes are used in the system, the variable priority code is calculated using the time difference calculated in step 602 and, if appropriate, step 604. The variable priority code corresponds generally to the time difference. The greater the time difference, the higher the variable priority code, and vice versa. Any one of a multitude of methods may be used to calculate the variable priority code. For example, the variable priority code could simply be equal to the time difference in seconds. Or, the variable priority code could be represented as an integer, equal to the time difference, in minutes. For example, if the time difference was 4 minutes, 28 seconds, the variable priority code would be equal to 4. Alternatively, no variable priority code could be used. In this case, processor 300 simply compares the time difference between competing members trying to gain permission to transmit. The member with the largest time difference is granted permission.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing fair access to members of a push-to-talk communication system, comprising the steps of:
   assigning a variable priority code to each of said members of said push-to-talk communication system;
   adjusting at least one of said variable priority codes in response to at least one predefined event, the predefined event chosen from the group consisting of a number of time periods which have elapsed since the last time a member requesting said transmission privilege was granted said transmission privilege, and the number of times a member has requested said transmission privilege and has been denied said transmission privilege; and
   granting a transmission privilege to one of said members based upon said variable priority codes.

2. The method of claim 1 wherein the step of adjusting at least one of said variable priority codes comprises the steps of:
   generating a transmission denial to a first member; and
   increasing a first variable priority code corresponding to said first member by a predetermined value.

3. The method of claim 2 wherein the step of increasing said first variable priority code comprises the step of adding a predetermined value to said first variable priority code.

4. The method of claim 3 further comprising the step of:
   assigning a fixed priority code to each of said members of said group communication system;
   wherein said predetermined value is equal to a first fixed priority code corresponding to said first member.

5. The method of claim 2 wherein the step of increasing said first variable priority code comprises the step of multiplying said first variable priority code by a predetermined value.

6. The method of claim 5 further comprising the step of:
   assigning a fixed priority code to each of said members of said group communication system;
   wherein said predetermined value is equal to a first fixed priority code corresponding to said first member.

7. The method of claim 2 further comprising the step of decreasing said first variable priority code if a predetermined time period has elapsed from a time that said transmission denial was generated.

8. The method of claim 2 wherein the step of generating said transmission denial comprises the steps of:
   receiving an access request from said first member;
   determining that a second member currently holds said transmission privilege, said second member having a corresponding second variable priority code greater than said first priority code; and
   increasing a denial count corresponding to said first member.

9. The method of claim 8 further comprising the step of notifying said first member that said access request has been denied.

10. The method of claim 2 wherein the step of generating said transmission denial comprises the steps of:
    receiving at least a first access request from said first member and a second access request from a second member at substantially the same time;
    comparing said first variable priority code to a second variable priority code corresponding to said second member;
    determining that said first variable priority code is lower than said second variable priority code; and
    increasing a denial count corresponding to said first member.

11. The method of claim 10 further comprising the step of notifying said first member that said first access request has been denied.

12. The method of claim 1 wherein the step of granting said transmission privilege comprises the steps of:
    configuring a traffic controller to connect a transmission from a first member who has been granted said transmission privilege to at least one other member of said broadcast system; and
    sending a confirmation message to said first member.

13. The method of claim 12 further comprising the step of adjusting a first variable priority code corresponding to said first member to a default value.

14. The method of claim 12 further comprising the step of decreasing a first variable priority code corresponding to said first member by a predetermined value.

15. Apparatus for providing fair access to members of a push-to-talk communication system, comprising:
    a memory for storing a number of event occurrences corresponding to each of said members of said push-to-talk communication system, said event occurrences chosen from the group consisting of the number of time periods which have elapsed since a last time a member requesting said transmission privilege was granted said transmission privilege, and the number of times a member has requested said transmission privilege and has been denied said transmission privilege;
    a processor for receiving a first access request from a first member, for retrieving a first number of event occurrences from said memory corresponding to said first member, for retrieving a second number of event occurrences from said memory corresponding to a second member, for comparing said first number of event occurrences to said second number of event occurrences, and for granting a transmission privilege to one of said first and second members based upon said comparison.

16. Apparatus of claim 15 further comprising:
    a timer for providing a grant time at which a transmission privilege has been granted;
    said memory further for storing said grant time corresponding to at least one of said members who has been granted said transmission privilege.

17. Apparatus of claim 15 wherein said number of event occurrences is defined as the number of times a corresponding member has requested and been denied said transmission privilege.

18. Apparatus of claim 15 wherein said number of event occurrences is defined as the number of time periods which have elapsed since a corresponding member has been granted said transmission privilege.

19. Apparatus of claim 18 wherein one of said time periods is equal to one second.

20. A method for providing fair access to a group communication system, comprising the steps of:

receiving a first access request from a first member of said group communication system and a second access request from a second member of said group communication system;

retrieving a first number of event occurrences corresponding to said first member and retrieving a second number of event occurrences corresponding to said second member;

comparing said first number of event occurrences to said second number of event occurrences; and awarding a transmission privilege to a single member based on said comparison.

21. The method of claim 20 wherein said second access request occurs at substantially the same time as said first access request.

22. The method of claim 20 wherein said second access request occurs after said first member currently holds said transmission privilege.

23. The method of claim 20 wherein said number of event occurrences is defined as the number of times a corresponding member has requested and been denied said transmission privilege.

24. The method of claim 20 wherein said number of event occurrences is defined as the number of time periods which have elapsed since a corresponding member has been granted said transmission privilege.

25. The method of claim 24, wherein one of said time periods is equal to one second.

* * * * *